United States Patent [19]

Toyoda

[11] 4,359,815
[45] Nov. 23, 1982

[54] MACHINING CENTER WITH A ROBOT

[75] Inventor: Kenichi Toyoda, Hino, Japan

[73] Assignee: Fujitsu Fanuc Limited, Tokyo, Japan

[21] Appl. No.: 205,157

[22] Filed: Nov. 10, 1980

[30] Foreign Application Priority Data

Nov. 8, 1979 [JP] Japan .................... 54-143804

[51] Int. Cl.³ .................................. B23Q 3/157
[52] U.S. Cl. .............................. 29/568; 919/225
[58] Field of Search ................ 29/568; 408/35; 414/225, 222, 223

[56] References Cited

U.S. PATENT DOCUMENTS 4,065,988 1/1978 Latneis .................... 29/568 X
4,218,816 8/1980 Dormehl .................... 29/568

FOREIGN PATENT DOCUMENTS 28735 5/1981 European Pat. Off. .......... 414/225
137901 10/1979 German Democratic Rep. ... 29/568
1283584 7/1972 United Kingdom ............ 29/568
2008991 6/1919 United Kingdom ............ 414/225

*Primary Examiner*—William R. Briggs
*Attorney, Agent, or Firm*—Armstrong, Nikaido, Marmelstein & Kubovcik

[57] ABSTRACT

A machining center equipped with an integral robot device having a manipulating hand capable of approaching a spindle of the machining center, a tool storing magazine mounted on a machine body, a workpiece supply table disposed on a floor in the vicinity of the machine body, and a work table of the machine body so that an exchange of cutting tools may be carried out by the manipulating hand between the tool storing magazine and the spindle, and so that an exchange of workpieces may also be carried out by the manipulating hand between the tool storing magazine and the work table.

3 Claims, 4 Drawing Figures

MACHINING CENTER WITH A ROBOT

FIELD OF THE INVENTION

This invention relates to a machining center equipped with a robot device, wherein the robot device, having a manipulating hand, is integrally incorporated in a machine body of the machining center.

A machining center equipped with an automatic tool changer and capable of automatically exchanging tools between a tool storing magazine and a spindle of a machine body for applying various machining operations onto a workpiece to be processed has been widely practiced. On the other hand, there has been already provided a robot device conventionally referred to as an industrial robot which automatically performs, for labor saving, a workpiece setting operation comprising setting a workpiece to be machined (hereinafter referred to as a "workpiece") onto an automatically controlled machine tool from a workpiece supplying table and returning the workpiece after completion of machining to the workpiece supplying table from the automatically controlled machine tool. However, in the conventional arrangement, the robot device is separately provided and disposed adjacent to the machining center to supply workpieces to the machining center from the workpiece supplying table which is also disposed near the machining center. Automatic exchange of tools is carried out by the automatic tool changer mounted on the machining center, and the robot device does not participate in such an automatic tool exchanging operation. Therefore, this conventional machining center requires and occupies a considerable space in a machining working site for floor spaces covered by the workpiece supplying table and the robot device as well as the machining center and a working space for conveying the workpiece from the workpiece supplying table to the machining center by the robot device and vice versa. This increases a plant investment and, accordingly, increases the machining cost of the workpiece. In addition, since such a discretely provided robot device has a moving guide for guiding a manipulating hand and a robot arm on a base of the robot device, it has, in general, a limit in mechanical rigidity and has a limit in size and weight of the workpiece to be conveyed.

SUMMARY OF THE INVENTION

It is, therefore, an object of the present invention to provide a machining center equipped with a robot device wherein the robot device, having a manipulating hand is integrally incorporated in a machine body for reducing a space occupied by installations in a machine working site, limiting the working space of the robot device to a definite minimum space in the vicinity of the machine body to assure operational safety and increasing the mechanical rigidity of the robot device.

BRIEF DESCRIPTION OF THE DRAWINGS

The invention will be better understood from the following description taken in connection with the accompanying drawings in which.

DESCRIPTION OF THE EMBODIMENT

Figure 1:
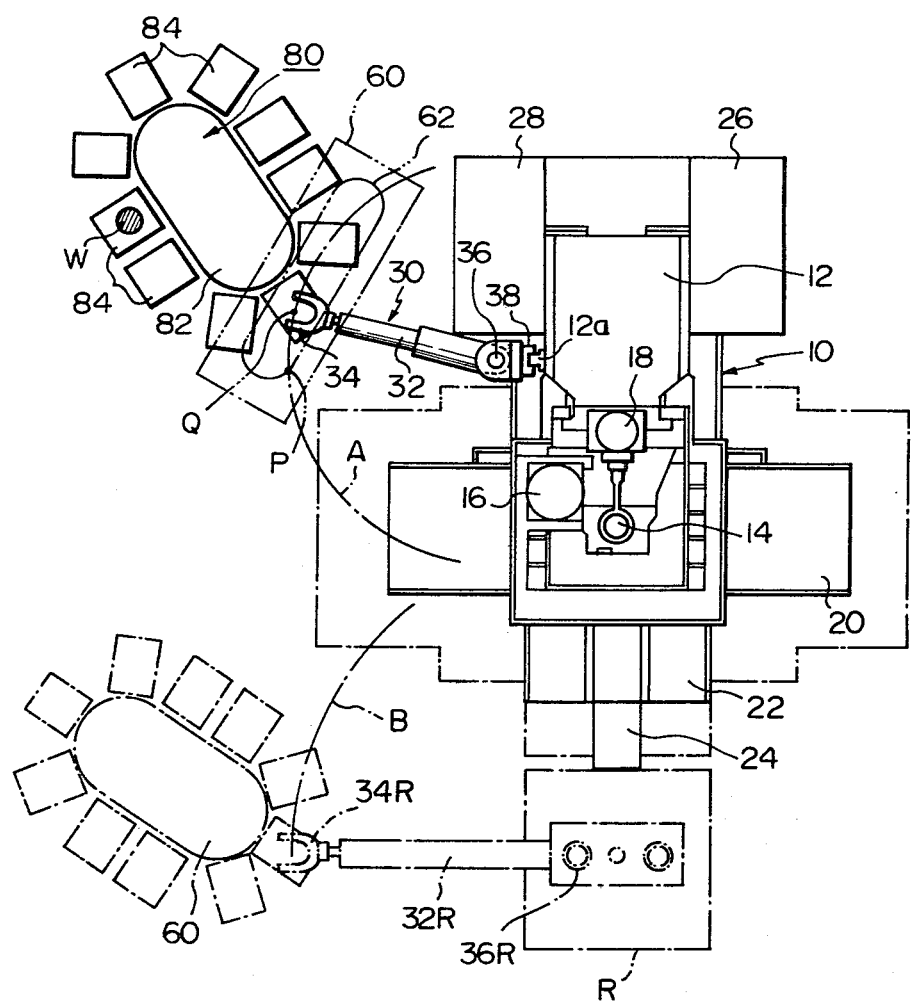
FIG. 1 is a plan view of one embodiment of a machining center equipped with a robot device, in accordance with the present invention.
Figure 2:
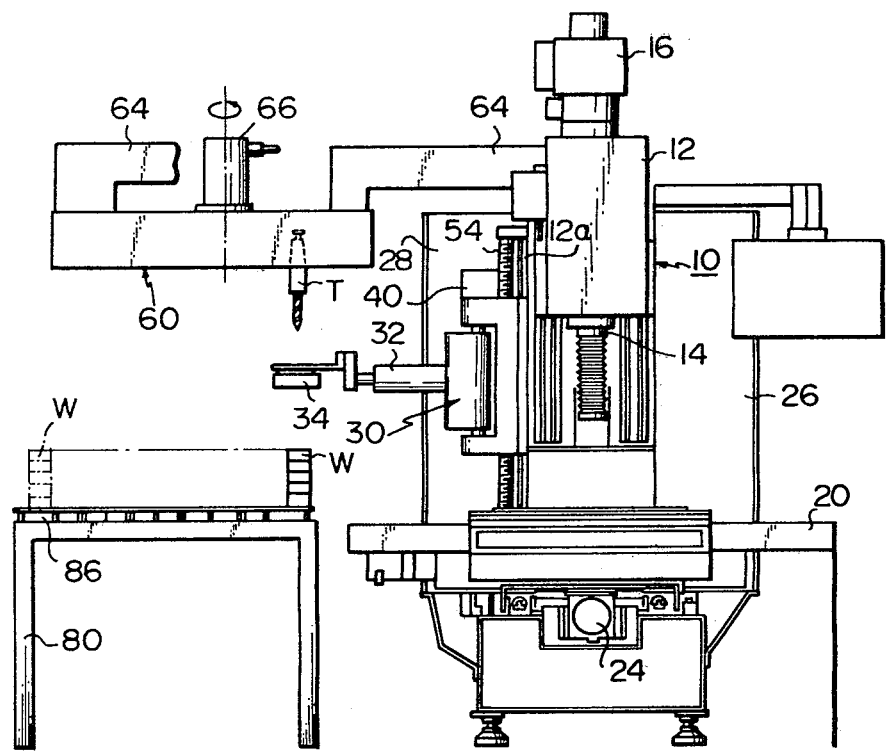
FIG. 2 is a front view of the embodiment illustrated in FIG. 1.

FIG. 1 is a plan view of an embodiment of a machining center equipped with a robot device in accordance with the present invention and FIG. 2 is a front view of the same. In FIGS. 1 and 2, the machining center is comprised of a machine body 10, a robot device 30 and a tool storing magazine 60. A workpiece supplying table 80 is provided in close vicinity to the machining center. The machine body 10 has a stationary column 12, and a spindle 14 fitted in a spindle head and disposed in front of the stationary column 12 and adapted to be driven and rotated by a spindle drive motor 16. The spindle 14 is movable, conjointly with the spindle head, in the vertical direction along a vertical guide shaft 18. A work table 20 is also disposed in front of the stationary column 12 so that it may be movable within a horizontal plane in a lateral, X-axis direction and in a Y-axis direction perpendicular to the X-axis direction along a slide 22. Reference numeral 24 designates a Y-axis motor for driving the work table 20 in the Y-axis direction. Another motor (not illustrated) is provided to drive the work table 20 in the X-axis direction. On opposite sides of the stationary column 12 there are provided a numerical control device 26 and an electric control device 28. In accordance with the present invention, the robot device 30 which is movable in the vertical direction along a vertical guide rod 12a is integrally incorporated in the machine body 10 on a sidewall of the stationary column 12. The robot device 30 has a robot arm 32 extending in the horizontal direction and a manipulating hand 34 provided at a tip end of the robot arm 32. The robot arm 32 and the manipulating hand 34 are adapted to turn around a pivot shaft 36 along a radial trajectory designated by reference "A" in FIG. 1. 38 is a guide block of the robot device 30 which is engaged with the linear guide rod 12a. The structure and operation of the robot device 30 will be described in detail later. The tool storing magazine 60 is disposed at the side of the stationary column 12 and connected to an upper end portion of the stationary column 12 of the machine body 10 through an arm 64. The tool storing magazine 60 holds a plurality of cutting tools T set in respective tool arbors as in a tool storing magazine of a known automatic tool changer. Within the tool storing magazine 60, the cutting tools T are moved along a given trajectory by a chain drive mechanism 62 which is driven by a rotating drive motor 66 and, in mid course, each tool passes a preselected position P for tool exchanging. A workpiece supplying table 80 is disposed on a floor near the machine body 10. The workpiece supplying table 80 is comprised, for example, of an elliptical workpiece retaining table 82 as depicted and a plurality of sub-tables 84 which move around the workpiece retaining table 82. The circular movement of the sub-tables 84 is carried out by such an arrangement that the sub-tables 84 are connected to a conventional endless chain mechanism which makes circular movement by a drive motor (not illustrated) and the sub-tables 84 are each provided with rollers 86 to enable the sub-tables 84 to move around the workpiece retaining table 82. Each of the sub-tables 84 holds a workpiece W thereon which has been supplied from the workpiece retaining table 82 and is moved to pass a position Q for delivering the workpiece W. The above-described preselected position P for tool exchanging and the workpiece delivering position Q are both on the working trajectory A of the manipulating hand 34 and the positions P and Q are suitably spaced from each other.

Figure 3:
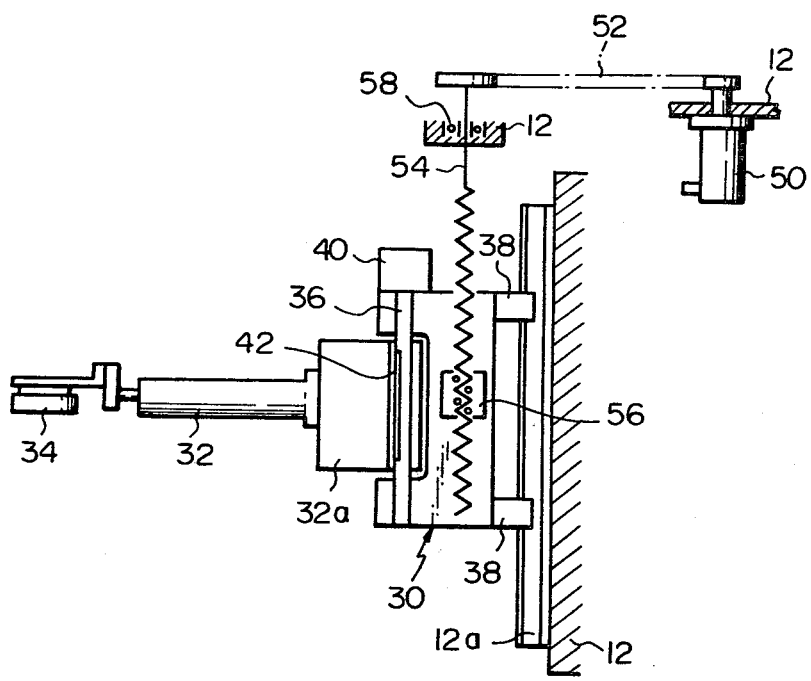
FIG. 3 is a schematically diagrammatic view for explaining the construction and operation of the robot device; and, FIG. 4 is a schematic perspective view of the embodiment illustrated in FIG. 1.

The robot device 30 of the present invention will now be described in connection with a schematically diagrammatic view of the device 30 illustrated in FIG. 3. The same reference numerals as those used in FIGS. 1 and 2 designate the same parts, respectively. In FIG. 3, the robot device 30 is mounted by the guide block 38 so that it may slide in a vertical direction along the vertical guide rod 12a formed integrally with the stationary column 12. More specifically, since the load of the robot device itself is supported by the stationary column 12 of the machine body 10, the robot device 30 of the present invention is more advantageous than the conventional separately provided robot device in that the mechanical rigidity of the present robot device is highly increased. The vertical sliding movement of the robot device 30 is attained through engagement between a ball screw shaft 54 which is rotatably supported by the stationary column 12 through a bearing 58 and a ball nut 56 provided inside the robot device 30. When the ball screw shaft 54 is driven and rotated by a drive motor 50 such as an electric servo motor mounted on the stationary column 12 through a pulley mechanism 52, the robot device 30 is smoothly driven linearly in a vertical direction through the mesh of the ball screw shaft 54 with the ball nut 56. On the other hand, the robot arm 32 of the robot device 30 is rigidly held by a bracket 32a and the bracket 32a is fixed to the pivot shaft 36 by a key 42. Therefore, when the pivot shaft 36 is driven to turn by a drive motor 40, the robot arm 32 and the manipulating hand 34 also make a turn conjointly with each other through the bracket 32a. The drive motor 40 may be comprised of a reversible rotation type motor so that the robot arm 32 and the manipulating hand 34 can make a reciprocating turning movement. The manipulating hand 34 has a workpiece gripping function which is actuated by appropriate actuators as in the conventional robot device.

The operation and advantageous effects of the machining center equipped with the aforesaid robot device 30, according to the present invention will now be described.

Referring again to FIGS. 1 and 2, in the present machining center with the robot device, the robot device 30 is so adapted that the manipulating hand provided at the tip end of the robot arm 32 may move following the trajectory A (FIG. 1), so that the manipulating hand 34 can reciprocate between the tool storing magazine 60 and the spindle 14 and also reciprocate between the workpiece supplying table 80 and the work table 20. Furthermore, as can be understood from FIG. 2, when the robot device 30 moves up and down along the vertical guide rod 12a of the stationary column 12, the manipulating hand 34 at the tip end of the robot arm 32 can approach the tool storing magazine 60 at the position P on the trajectory A to grip one of the tools T together with its tool arbor and can also approach one of the sub-tables 84 on the workpiece supplying table 80 at the position Q on the trajectory A to grip the workpiece W on the sub-table 84. Thus, the robot device 30 can achieve tool exchanging between the spindle 14 and the tool storing magazine 60 and can attain delivery or setting of the workpiece W from the workpiece supplying table 80 onto the work table 20 for the purpose of workpiece exchanging. For instance, to carry out automatic exchange of the tools T, the manipulating hand 34 of the robot device 30 is first moved along the trajectory A to a position under the spindle 14 and then moved up and down to remove the tool T with the arbor which have been fitted to the spindle 14 and then returns, along the trajectory A, to the position P under the tool storing magazine 60. The manipulating hand 34 at the position P is subsequently moved upwardly to return the used tool T, which has been removed from the spindle 14, to its predetermined tool storing position in the magazine 60 and is then moved downwardly. Thereafter, the tools within the tool storing magazine 60 are caused to advance until a desired fresh tool T reaches the position P. Then, the manipulating hand 34 is again moved upwardly to grasp the fresh tool T, moved downwardly to remove the tool T from the tool storing magazine 60 and turned along the trajectory A to bring the fresh tool T to under the spindle 14. Then, the fresh tool T is fitted to the spindle 14 in a sequence reversed from that of the aforesaid removal operation of the used tool to complete automatic tool exchanging. Similarly, the robot device 30 can transfer the workpiece W from the workpiece supplying table 80 to the work table 20 for setting the workpiece and can return the workpiece W after completion of the machining to the workpiece supplying table 80 from the work table 20 by the functions of the manipulating hand 34 which can turn along the trajectory A and move up and down along the vertical guide rod 12a of the stationary column 12.

At this stage, the structure and operation of the machining center equipped with the robot device in accordance with the present invention are compared with those of the conventional machining center wherein a robot device of an independent structure is disposed in close proximity to the machine body 10 as illustrated by R in FIG. 1. First, the conventional arrangement is disadvantageous in that the installation space required for one machining center is larger because the installation of the robot device R requires a considerable floor area. In contrast, the present invention requires no special space for installation of the robot device 30 and enables compact formation of the machining center and a reduction in the installation area because the robot device 30 is integrally mounted on the stationary column 12 of the machine body 10. Furthermore, in the conventional arrangement, when a robot arm 32R of the robot device R is turned around a pivot shaft 36R, a manipulating hand 34R rotates along a trajectory B in front of the machine body so that an area inside the trajectory B is occupied as the working space of the robot device R and it is dangerous for an operator to enter the working space during the operation of the machining center. However, it is often necessary for the operator to have access to the machine from the front of the machine body for inspection of the progress of the machining operation or inspection of the workpiece setting operation. For this reason, the conventional arrangement is not sufficient to assure the safety of the operator. In this respect, according to the present invention, the working space of the robot device 30 is provided at a side of the machine body 10 so that the operator has easy access to the machine from the front of the machine body 10 and safety is assured. Furthermore in accordance with the present invention, the robot device 30 carries out automatic tool exchanging and workpiece setting in a proper sequence, so that there is no fear that the two operations interfere with each other. Thus, interference with the tool storing magazine which can possible be caused by the conventional robot device of an independent structure when the device carries the workpiece W, can be eliminated completely. In addition, the present robot device 30 is superior in mechanical rigidity as described above.

Figure 4:
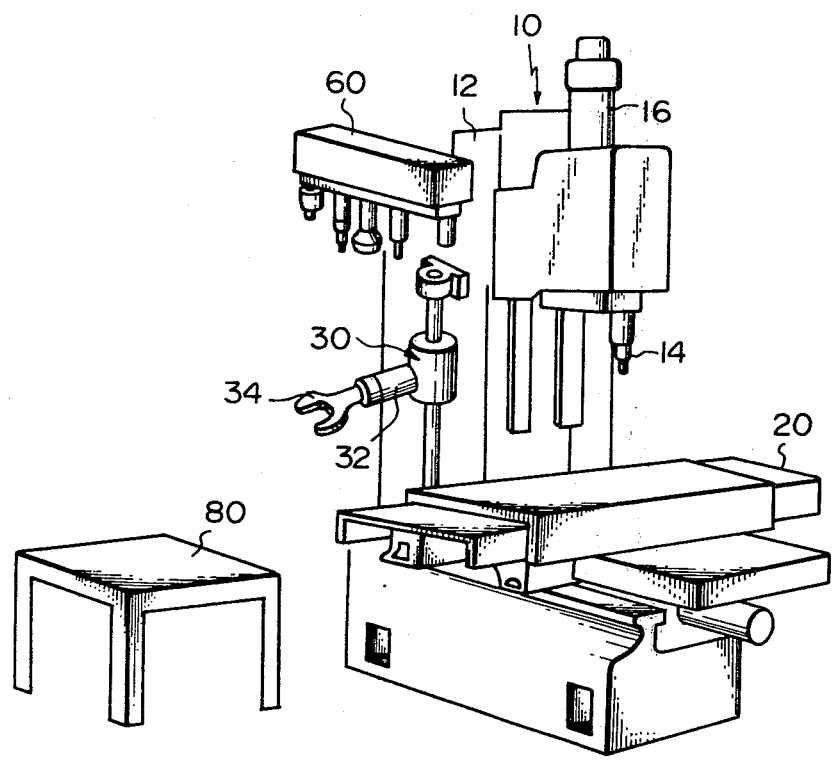

FIG. 4 is a schematic perspective view of the maching center with the robot device of the present invention illustrated in FIGS. 1 to 3, illustrating positional relations between the machine body 10, the robot device 30, the tool storing magazine 60 and the workpiece supplying table 80 in three dimensions.

Although the manipulating hand 34 of the robot device 30 is adapted to rotate along the given trajectory A in the embodiment as described above, the robot arm 32 of the robot device 30 may be formed contractible in its axial direction. In this case, the movement of the manipulating hand 34 is not restricted to the trajectory A so that the position of the workpiece supplying table 80 installed on the floor may be selected very freely, while keeping the advantage that the robot device can be supported rigidly, utilizing the rigidity of the machine body as in the embodiments illustrated.

I claim:

1. A machining center for automatically effecting machinings to a workpiece supplied from a workpiece supply table disposed on a floor in a vicinity of the machining center, comprising:
    a machine body including a rigid column, a vertical spindle head attached to said rigid column and incorporating therein a vertical spindle to which a cutting tool is removably fitted, and a work table on which a workpiece is removably mounted;
    a tool storing magazine fixed to said machine body for removably storing therein a plurality of cutting tools, and;
    a robot device integrally mounted on said machine body and movable for effecting a tool exchange between said tool storing magazine and said vertical spindle and a workpiece exchange between said workpiece supply table and said work table of said machine body.

2. A machining center as claimed in claim 1, wherein said tool storing magazine is arranged so as to extend toward a position above said workpiece supply table, and wherein said robot device comprising: a first means for vertically moving said robot device along a vertical guide attached to said rigid column; a laterally extending robot arm turnable in a horizontal plane around a vertical axis; a second means for driving a turning of said robot arm, and; a manipulating hand attached to the tip end of said robot arm.

3. A machining center as claimd in claim 2, wherein said first means comprises a ball screw shaft engaged with a ball nut, both being incorporated in said robot device, and an electric servo motor for rotating said ball screw by means of a belt-pulley mechanism, and wherein said second means comprises a vertical turning shaft rotated by an electric servo motor, and a bracket by which said robot arm is fixedly attached to said vertical turning shaft.

* * * * *